(12) United States Patent
Akimoto et al.

(10) Patent No.: US 7,453,655 B2
(45) Date of Patent: Nov. 18, 2008

(54) LENS BARREL AND IMAGE PICKUP APPARATUS

(75) Inventors: Katsuji Akimoto, Tokyo (JP); Kiyoshi Ishige, Chiba (JP)

(73) Assignee: Sony Corporation (JP)

(*) Notice: Subject to any disclaimer, the term of this patent is extended or adjusted under 35 U.S.C. 154(b) by 202 days.

(21) Appl. No.: 10/536,060

(22) PCT Filed: Dec. 3, 2003

(86) PCT No.: PCT/JP03/15473

§ 371 (c)(1), (2), (4) Date: Oct. 3, 2005

(87) PCT Pub. No.: WO2004/051339

PCT Pub. Date: Jun. 17, 2004

(65) Prior Publication Data

US 2006/0125951 A1    Jun. 15, 2006

(30) Foreign Application Priority Data

Dec. 5, 2002    (JP)    ............................. 2002-353222

(51) Int. Cl.
G02B 7/02    (2006.01)
(52) U.S. Cl. .................................................... 359/819
(58) Field of Classification Search ............ 348/207.99, 348/335, 360; 42/76.01, 90, 111; 89/14.05
See application file for complete search history.

(56) References Cited

U.S. PATENT DOCUMENTS

| 5,751,463 A | * | 5/1998 | Inoue et al. ................. 359/205 |
| 5,870,133 A | * | 2/1999 | Naiki ........................... 347/247 |
| 2002/0131782 A1 | * | 9/2002 | Yamaguchi et al. ......... 396/429 |

FOREIGN PATENT DOCUMENTS

| JP | 06-102447 A | 4/1994 |
| JP | 9096523 A | 4/1997 |
| JP | 2001051175 A | 2/2001 |
| JP | 2002182089 A | 6/2002 |

* cited by examiner

Primary Examiner—Scott J. Sugarman
Assistant Examiner—Mahidere S Sahle
(74) Attorney, Agent, or Firm—Lerner, David, Littenberg, Krumholz & Mentlik, LLP

(57) ABSTRACT

At the time of crimping and fixing a plastic lens on a lens barrel, productivity is improved by achieving an accurate alignment and a reliable crimping. Fixed protrusions are arranged on an outer peripheral portion of the lens at intervals capable of providing three-point support, and a fixed protrusion is arranged on a line connecting the fixed protrusion and the center of the lens, a reference hole corresponding to one of the fixed protrusions includes an opening having substantially the same size as that fixed protrusion, and the other fixed protrusions have substantially the same size and fit in loosely fitting holes. The loosely fitting holes corresponding to the fixed protrusions include larger openings than the fixed protrusions and an elongated hole corresponding to another fixed protrusion is provided in such a manner as to be elongated along a direction of the reference hole.

5 Claims, 7 Drawing Sheets

LENS BARREL AND IMAGE PICKUP APPARATUS

TECHNICAL FIELD

The present invention relates to a lens barrel and an image pickup apparatus in which a plastic lens is fixed to a lens holding portion.

BACKGROUND ART

Conventionally, in a lens barrel using a glass lens, a lens has been fixed to a lens barrel by crimping a lens holding portion on the lens barrel side, which is made of a molding material. This case has the following problems.

In other words, there are listed problems in that 1. the glass lens is expensive in view of component costs, 2. the glass lens is heavy in weight, and 3. the glass lens has no freedom in shape and thus it is impossible to form a crimp shape such as a boss and a hole. Accordingly, there is no choice but to caulk the lens barrel side. The glass lens is required to have space for crimping outside an outer diameter dimension required optically, by which the weight becomes heavy.

Meanwhile, in a lens barrel in which a plastic lens is attached to a lens holding portion, an attaching method of pushing the plastic lens to the lens barrel by a spring force using a plate spring is disclosed (for example, refer to Patent Document 1).

However, this case has the following problems. In other words, the number of components and the costs corresponding to the plate spring are required. Furthermore, an optimal fixing pressure that does not affect lens surface accuracy needs to be set.

Here, a concrete explanation of thermal crimping using a conventional plastic lens according to Patent Document 2 is illustrated in FIGS. 6 and 7. FIG. 6 is a cross-sectional view showing an outline shape of the plastic lens and FIG. 7 is a front view showing an outline shape of a lens holding portion.

In this lens barrel, a plastic lens 3 is crimped in an attached state to a lens holding portion 2 and fixed. As shown in FIG. 6, as a material of the plastic lens 3, an epoxy-based thermoplastic resin (for example, ZEONEX 480S: trade name, produced by Zeon Corporation) is used.

In the circumference of the lens 3, three fixed protrusions (bosses) 4, 5, 6 each having a thickness in a range of $\phi 1$ mm−0.01 mm to −0.03 mm are provided. In contrast, in the lens holding portion 2, three supporting holes, that is, a reference hole 8, a loosely fitting hole 9, and an elongated hole 10 are provided, as shown in FIG. 7.

The reference hole 8 is formed with $\phi 1$ mm+0.01 mm to 0, which is almost the same size of the fixed protrusion 4 of the plastic lens 3, and fits with the fixed protrusion 4 to thereby be positioned.

The loosely fitting hole 9 is formed with $\phi 1.2$ mm+0.03 mm to +0.01 mm, which is formed so as to be larger than the fixed protrusion 5 of the plastic lens 3, and has looseness in a plane direction in a state in which the fixed protrusion 5 is fitted.

The elongated hole 10 is formed with ($\phi 1$ mm+0.015 mm to 0)×1.2, and the fixed protrusion 6 of the plastic lens 3 is fitted into the elongated hole 10 to thereby position the lens 3 in a rotative direction thereof.

The fixed protrusions 4 to 6 are thermally deformed with a pin of a crimping jig in a state in which the fixed protrusions 4 to 6 are fitted into the supporting holes corresponding to the same, respectively, at the above-described three positions to squash into an umbrella shape, thereby crimping and fixing the lens 3 to the lens holding portion 2.

Patent Document 1: Japanese Published Unexamined Application No. 58-187907

Patent Document 2: Japanese Published Unexamined Application No. 2002-182089

However lens holding by fitting the three fixed protrusions into the supporting holes and by thermal crimping as described above is difficult to obtain position accuracy because the fixed protrusion as the reference and the fixed protrusion corresponding to the elongated hole are at a position opposed to each other at 120°, and is difficult to obtain a crimping condition because there are three kinds of fixed protrusions and hole shapes, respectively, which are subjected to the thermal crimping, and those three are different, thereby leading to a decrease in productivity.

DISCLOSURE OF THE INVENTION

The present invention is achieved in order to the abovementioned problems. In other words, the present invention is configured so that in a lens barrel having a plastic lens provided with first to fourth fixed protrusions in a circumference thereof and a lens holding portion provided with first to fourth supporting holes corresponding to the respective fixed protrusions of the lens, among the first to fourth fixed protrusions, the first to third fixed protrusions are arranged in an outer peripheral portion of the lens at intervals capable of three-point supporting, and the fourth fixed protrusion is arranged on a line connecting the first fixed protrusion and the center of the lens, wherein the first supporting hole corresponding to the first fixed protrusion is provided as a reference hole including an opening having substantially the same size as the first fixed protrusion, the second and third fixed protrusions have the same size and the second and third supporting holes have almost the same size and further the second and third supporting holes corresponding to the second and third fixed protrusions are provided as loosely fitting holes including larger openings than the second and third fixed protrusions, and the fourth supporting hole corresponding to the fourth fixed protrusion is formed with an elongated hole provided in such a manner as to be elongated along a direction of the first supporting hole.

In the present invention described above, since the first fixed protrusion and the fourth fixed protrusion, and the first supporting hole and the fourth supporting hole corresponding to the same are arranged oppositely on the line connecting with the center of the lens, these fittings allow the lens to be aligned most accurately. Furthermore, the first to third fixed protrusions and the first to third supporting holes are arranged at intervals capable of three-point supporting in the circumferential direction, among which the second and third fixed protrusions have almost the same size and the second and third supporting holes have almost the same size, so that their crimping conditions are able to be made the same.

BRIEF DESCRIPTION OF THE DRAWINGS

Other objects and advantages of the present invention will be apparent from the following detailed description of the presently preferred embodiments, which description should be considered in conjunction with the accompanying drawings in which like references indicate similar elements and in which.

BEST MODE FOR CARRYING OUT THE INVENTION

Hereinafter, an embodiment of the present invention is described based on the drawings. In the embodiment described below, the present invention is applied to a lens barrel (main lens barrel) of an image pickup apparatus, for example, an intermediate lens barrel used for arranging a third lens group.

Figure 1:
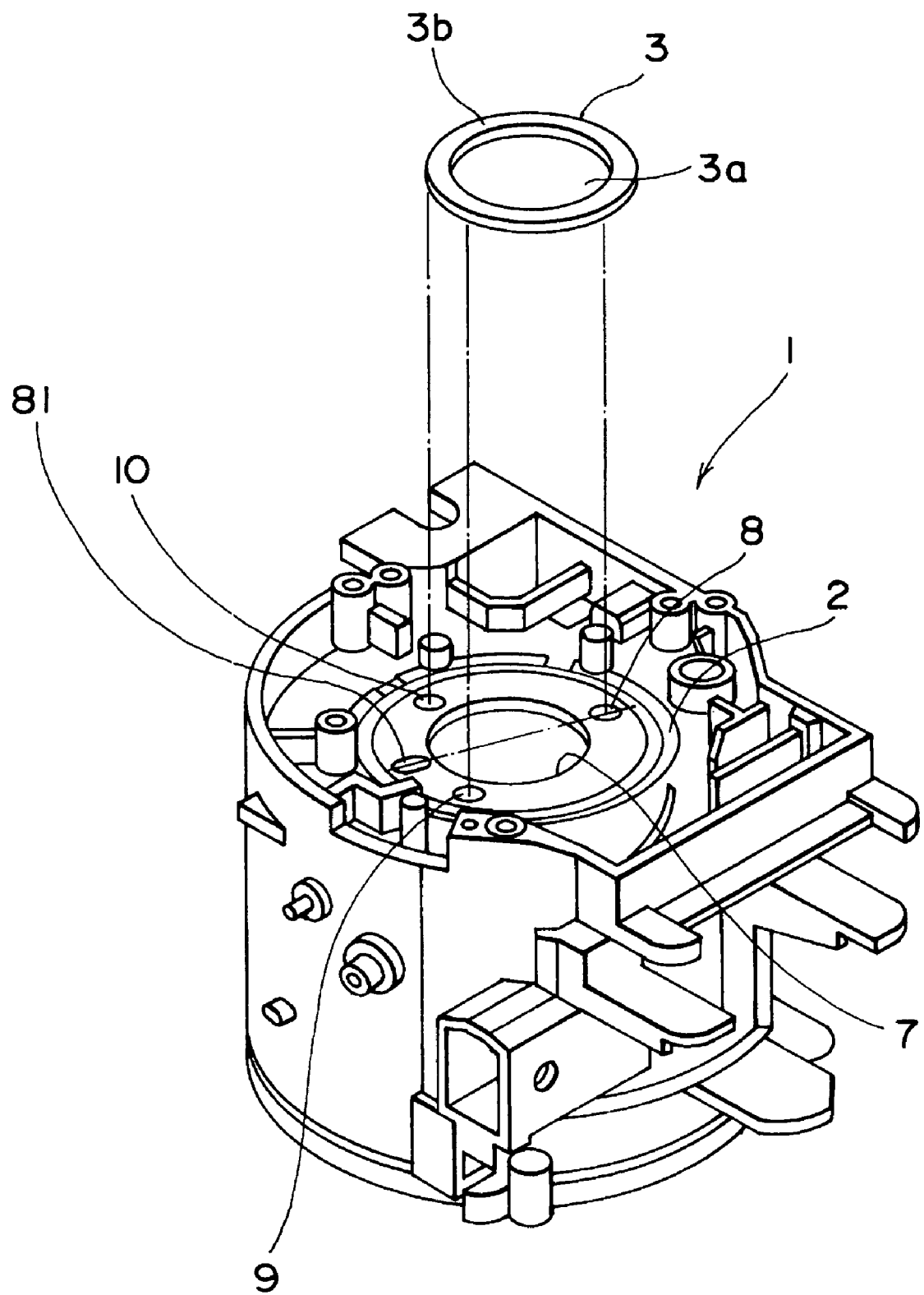
FIG. 1 is a partially exploded perspective view of a lens barrel according to the present embodiment.
Figure 2A:
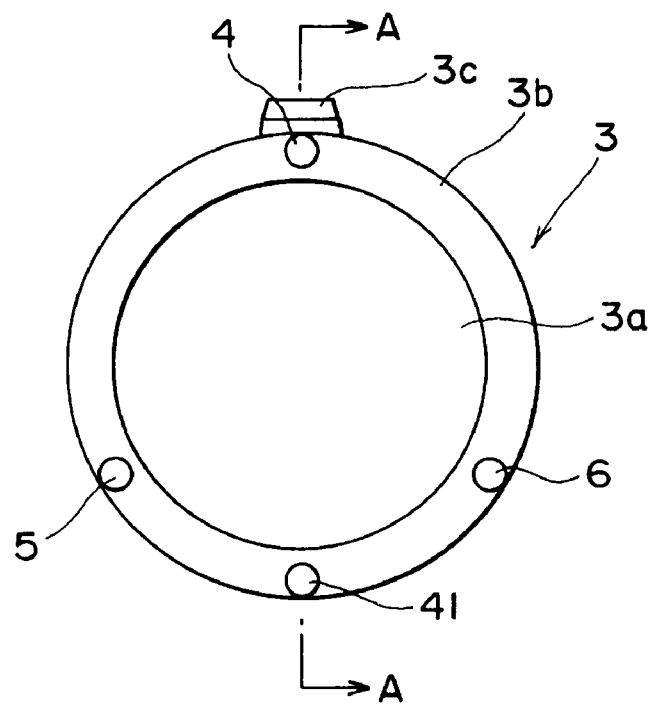
FIG. 2A is a plan view of a lens.
Figure 2B:
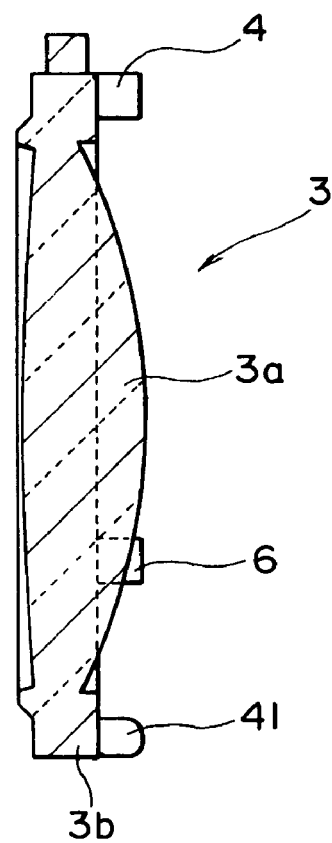
FIG. 2B is a cross-sectional view taken along the line A-A in FIG. 2A.
Figure 3:
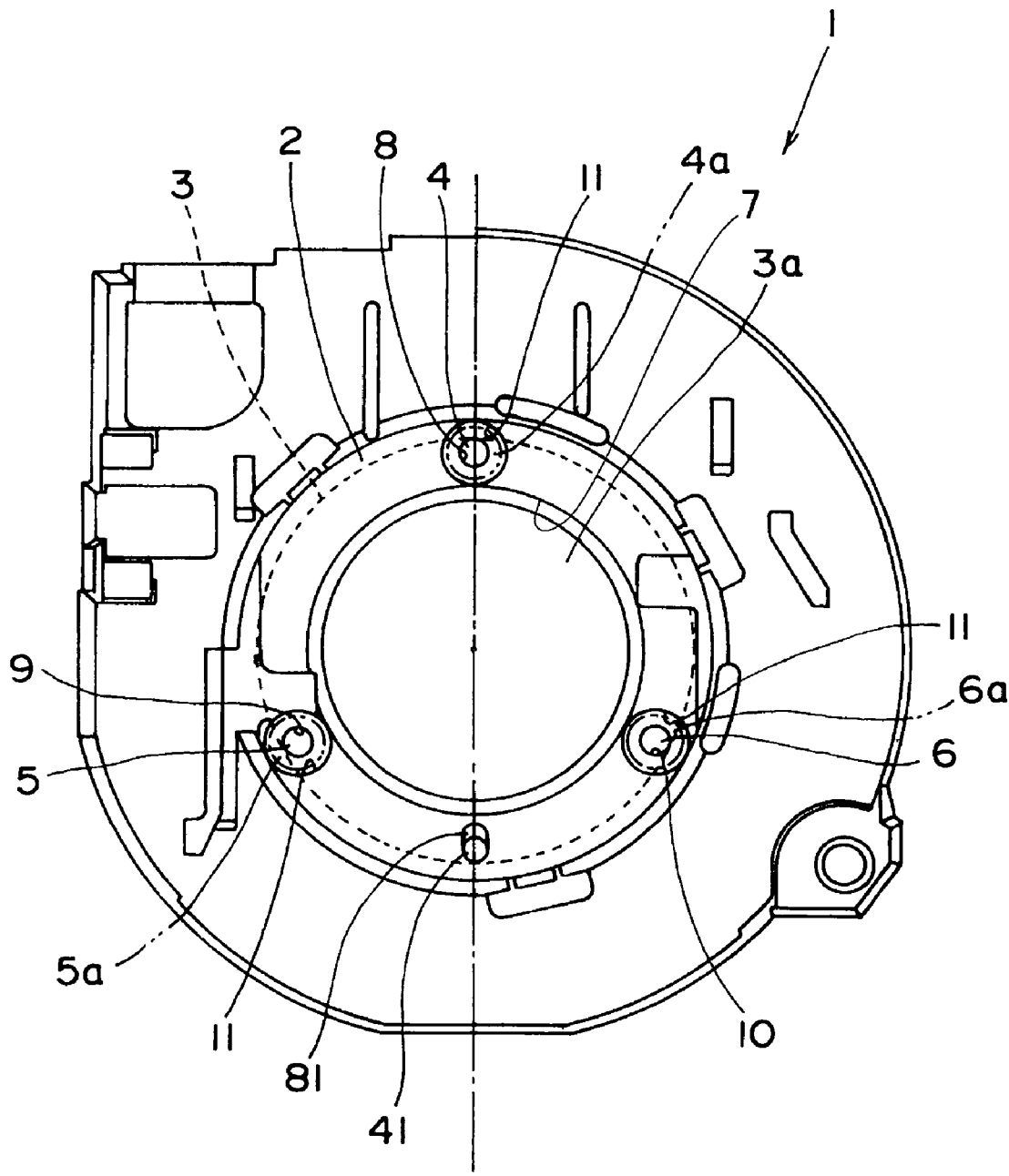
FIG. 3 is a plan view of a lens holding portion.

FIG. 1 is a partially exploded perspective view for explaining a lens barrel according to the present embodiment, FIG. 2 is views for explaining an outline of a lens, FIG. 2A being a plan view and FIG. 2B being a cross-sectional view taken along the line A-A in FIG. 2A, and FIG. 3 is a plan view for explaining an outline of a lens holding portion.

In order to constitute an intermediate lens barrel of a lens system not shown in the figure, a lens barrel 1 is made of, for example, polycarbonate resin and is formed into a substantially cylindrical shape. This lens barrel 1 is opened at one end in an optical axis direction, while being closed at the other end by the lens holding portion 2 with a central portion thereof opened. To this lens holding portion 2, the plastic lens 3 is fixed.

In this lens holding portion 2 of the present embodiment, there are provided four supporting holes including one reference hole 8, two loosely fitting holes 9, 10, and one elongated hole 81. The reference hole 8 and the two loosely fitting holes 9, 10 are arranged at intervals of about 120° in a circumferential direction of the lens 3, and the elongated hole 81 is arranged at a position opposed to the reference hole 8 at 180°. Furthermore, the elongated hole 81 is formed in such a manner as to be elongated along a direction of the reference hole 8.

The lens 3 is constituted by integrally forming a lens portion 3a formed into a curved surface of a predetermined shape, a flange portion 3b provided in an outer peripheral portion thereof, and four fixed protrusions 4, 5, 6, 41 protruded in the optical axis direction from this flange portion 3b.

Among the fixed protrusions 4, 5, 6, 41, the fixed protrusions 4, 5, 6 are arranged at intervals of about 120° along an outermost periphery of the flange portion 3a capable of three-point supporting, and correspond to the reference hole 8, the loosely fitting holes 9, 10 of the lens supporting portion 2 described before, respectively.

Furthermore, the fixed protrusion 41 is arranged at a position opposed to the fixed protrusion 4 at 180° along the outermost periphery of the flange portion 3b, and corresponds to the elongated hole 81 of the lens holding portion 2 described before. Furthermore, as a material of the lens 3, acrylic thermoplastic resin (for example, ZEONEX, 480S: trade name, produced by Zeon Corporation) is used. The surface of the lens portion 3a is coated with an antireflection film.

The size of the fixed protrusions 4, 5, 6, 41 provided in the lens 3 is, for example, φ1.5 mm−0.01 mm to −0.03 mm. In the lens 3, a portion located above the fixed protrusion 4 in the figure and protruded outward from the flange portion 3b is a gate portion 3c which is an inlet for injecting the resin into a mold when molding the lens 3, and the resin is charged into the mold through this gate portion 3c, so that the shapes and positions of the fixed protrusions 4, 5, 6, 41 is able to be designed freely.

As shown in FIG. 3, in the central portion of the lens holding portion 2, an attaching hole 7 for the lens 3 is formed and in a circumferential portion of the attaching hole 7, the reference hole 8, the loosely fitting holes 9, 10 and the elongated hole 81 are provided as supporting holes for the fixed protrusions 4, 5, 6, 41 of the lens 3 to penetrate in holding portion 2 in an optical axis direction and fit.

Among these, the reference hole 8 and the loosely fitting holes 9, 10 are arranged at intervals of about 120° in the circumferential direction, respectively, and the elongated hole 81 is arranged at the position opposed to the reference hole 8 at about 180° in the circumferential direction. Furthermore, the elongated hole 81 is formed in such a manner as to be elongated along the direction of the reference hole 8.

Figure 4A:
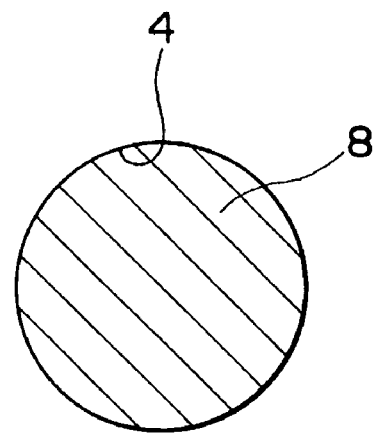
FIG. 4A is a plan view showing a relationship between a reference hole and a fixed protrusion.

The reference hole 8 is a supporting hole functioning as a reference for positioning when the lens 3 is attached, and is a circular hole having almost the same diameter as the fixed protrusion 4 (for example, φ1.5 mm+0.025 mm to +0.005 mm). FIG. 4A is a plan view showing a relationship between the reference hole 8 and the fixed protrusion 4.

Figure 4B:
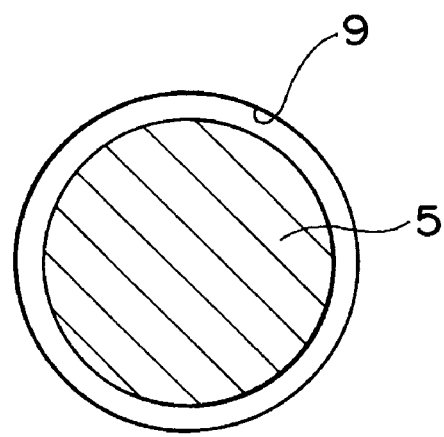
FIG. 4B is a plan view showing a relationship between a loosely fitting hole and a fixed protrusion.

Furthermore, the two loosely fitting holes 9, 10 are circular holes each having a larger diameter than the diameter of the fixed protrusions 5, 6 (for example, φ1.6 mm±0.02 mm). FIG. 4B is a plan view showing a relationship between the loosely fitting hole 9 and the fixed protrusion 5.

Figure 4C:
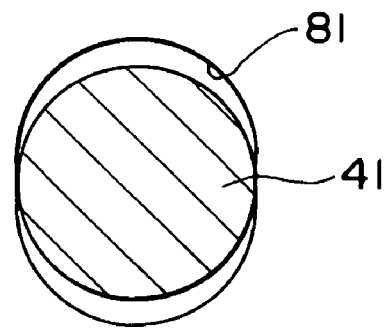
FIG. 4C is a plan view showing a relationship between an elongated hole and a fixed protrusion.

Furthermore, the elongated hole 81 is a hole provided in such a manner as to be elongated along a direction indicated by a dashed line in the figure passing the center of the reference hole 8, and for example, provided so as to be (φ1.5 mm+0.025 mm to +0.005 mm)×1.2. Furthermore, a diameter of the elongated hole 81 in a narrow side direction is almost the same as the diameter of the fixed protrusion 41 (for example, φ1.5 mm+0.025 mm to +0.005 mm). FIG. 4C is a plan view showing a relationship between the elongated hole 81 and the fixed protrusion 41.

Furthermore, back to FIG. 3, at opening edges of the above-mentioned reference hole 8 and the loosely fitting holes 9, 10, depressed portions are provided in such a manner as to be larger and circular to form difference 11. These are intended not to protrude umbrella-shaped portions when the fixed protrusions are crimped, as described later.

In order to fix the lens 3 to the lens holing portion 2 described above, the fixed protrusion 4 and the reference hole 8 are first aligned, and also, the fixed protrusions 5, 6 and the loosely fitting holes 9, 10, and the fixed protrusion 41 and the elongated hole 81 are schematically aligned and the respective fixed protrusions are inserted into the supporting holes. This allows the lens 3 to be tentatively fixed to the lens holding portion 2 of the lens barrel 1. At this time, tip ends of the fixed protrusions 4, 5, 6 and 41 are in a state protruded outward from the reference hole 8, the loosely fitting holes 9, 10 and the elongated hole 81.

Furthermore, this tentative fixing results in a state in which the lens 3 is arranged with the fitting position of the reference hole 8 and the fixed protrusion 4 used as the reference, and the fitting of the elongated hole 81 and the fixed protrusion 41 determines the position of the lens 3 in the rotative direction (rotative direction centering on the fitting position of the reference hole 8 and the fixed protrusion 4). At this time, even if there has been caused variation of the lens 3 at the molding time, the variation can be absorbed by the elongated hole 81, so that the lens 3 can be arranged without applying unallowable force.

In addition, since the position of the elongated hole 81 and the fixed protrusion 41 is arranged so as to be opposed to the position of the reference hole 8 and the fixed protrusion 4 at about 180° along the lens circumference, the accuracy in restricting an angle of the lens 3 can be maximized.

Subsequently, when the tip ends of the fixed protrusions 4, 5, 6 are crimped in an appropriate method, for example, with heat or supersonic wave, the tip ends of the fixed protrusions 4, 5, 6 are squashed into an umbrella shape to be fixed to the lens holding portion 2 without looseness.

Figure 5A:
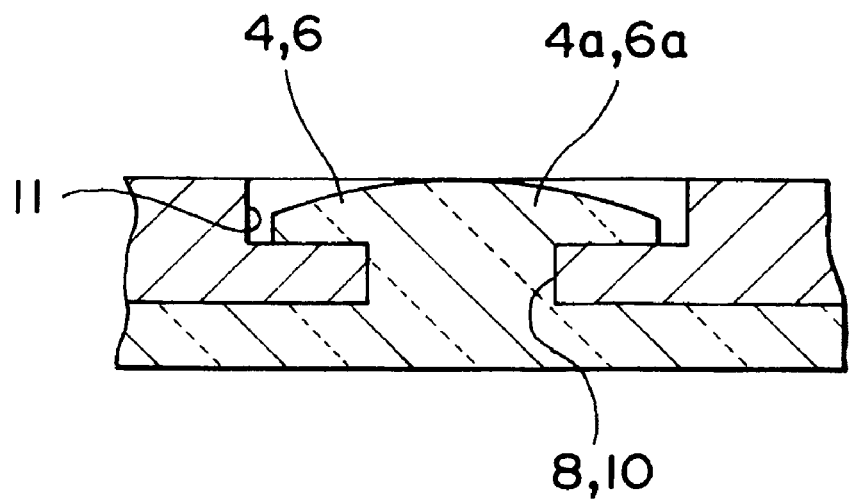
FIG. 5A is a cross-sectional view of a crimped fixed protrusion showing a reference hole portion.
Figure 5B:
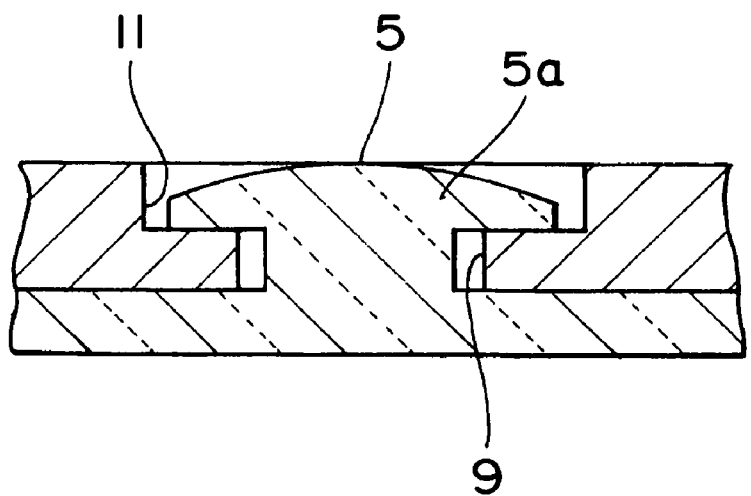
FIG. 5B is a cross-sectional view of a crimped fixed protrusion showing a loose fitting hole portion.
Figure 6:
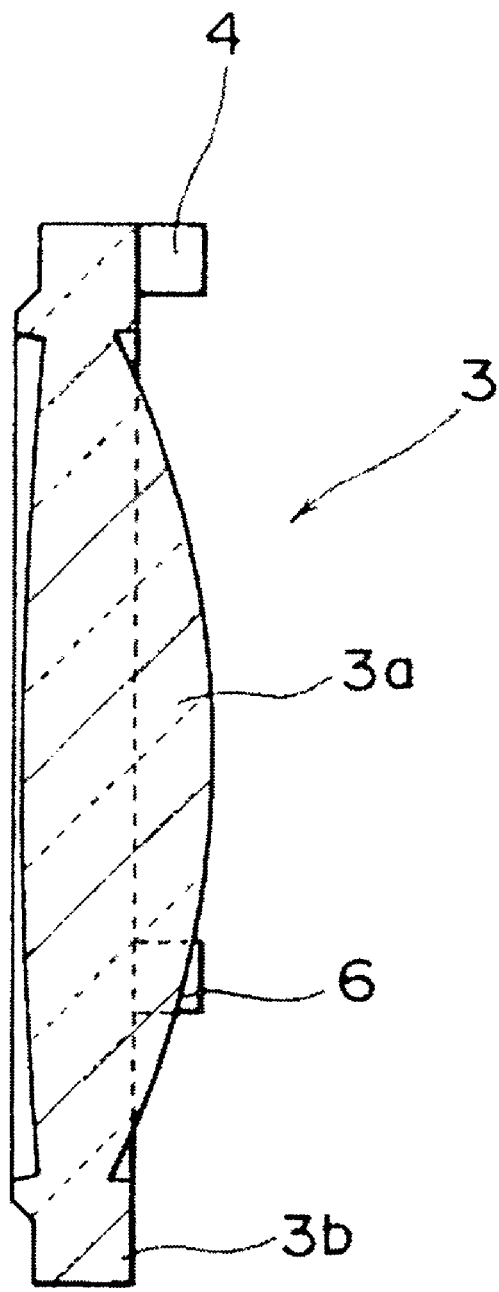
FIG. 6 is a cross-sectional view of a prior art plastic lens.
Figure 7:
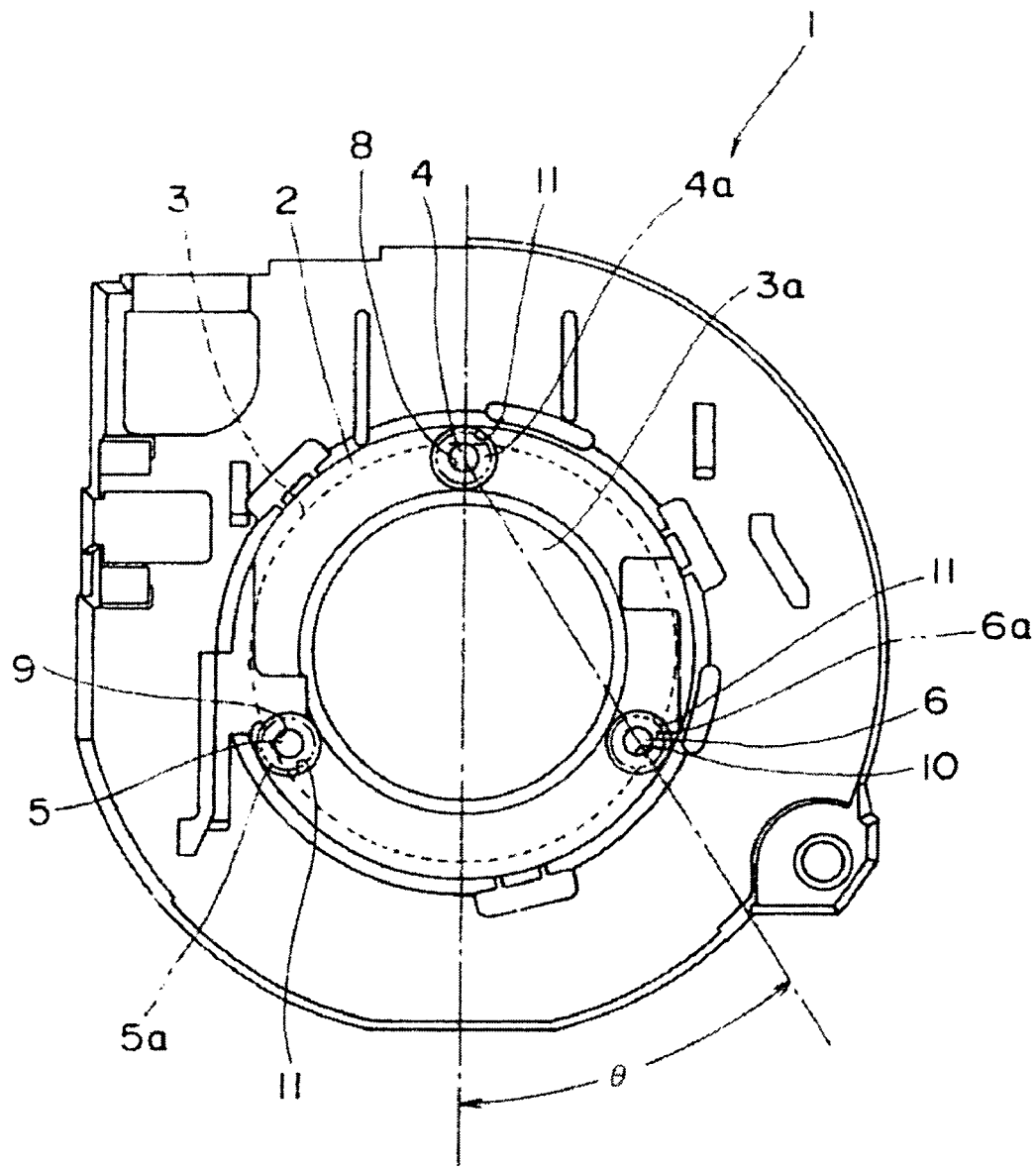
FIG. 7 is a front view of a prior art lens holding portion.

FIG. 5 is cross-sectional views showing a state in which the fixed protrusions are crimped, FIG. 5A showing the reference hole portion, and FIG. 5B showing the loose fitting hole portion. By this crimping, the tip end portions of the fixed protrusions 4, 5 and 6 are squashed and deformed into an umbrella shape to constitute umbrella-shaped portions 4a, 5a and 6a inside the depressed portions 11, thereby preventing the lens 3 from slipping off and completely fixing the lens 3 to the lens holding portion 2.

In the present embodiment, the crimping is performed at only the three positions of the reference hole 8 and the fixed protrusion 4, and the two loosely fitting holes 9, 10 and the fixed protrusions 5,6 to fix the lens 3 by three-point supporting. That is, the elongated hole 81 and the fixed protrusion 41 restrict the position in the rotative direction only by the fitting while having freedom in the elongated hole direction.

Furthermore, in the present embodiment, at the three positions of the reference hole 8 and the fixed protrusion 4, and the two loosely fitting holes 9, 10 and the fixed protrusions 5, 6, the two loosely fitting holes 9, 10 and the fixed protrusions 5,6 have the same size, respectively, so that the crimping conditions (for example, temperature, time, pressurizing force) can be the same.

In addition, since the size of the reference hole 8 and the fixed protrusion 4 is almost close to the size of the loosely fitting holes 9, 10 and the fixed protrusions 5, 6, the crimping condition of the fixed protrusion 4 with respect to the reference hole 8 can be the same as the crimping condition of the fixed protrusions 5,6 with respect to the loosely fitting holes 9, 10. Accordingly, the crimping at the three positions can be performed under the same condition, and thus secure crimping and fixing can be realized even by processing at a time.

Sizes of the fixed protrusions and the supporting holes in the above-described embodiment are one example and not limited. Furthermore, the positions and the number of the fixed protrusions and the supporting holes described in the present embodiment are not limited by the above description, and as long as at least the reference hole 8, the two loosely fitting holes 9, 10 and the elongated hole 81, and the fixed protrusions 4, 5, 6 and 41 corresponding to the above-mentioned holes are provided, the present invention can be realized even if a supporting hole and a fixed protrusion other than these are provided.

INDUSTRIAL APPLICABILITY

As described above, according to the present invention, the following effects are brought about. More In other words, there is an effect by using a plastic lens instead of a glass lens, that is, weight saving and cost down can be achieved and positioning accuracy of the lens can be increased. Also, even in the fixing by crimping, the crimping conditions of the respective fixed protrusions with respect to the respective supporting holes can be the same, so that even when all the fixed protrusions are crimped at a time, secure lens fixing can be performed. This enables stable manufacturing without variation and with better productivity in a manufacturing process.

The invention claimed is:

1. A lens barrel having a plastic lens provided with a flange part having first, second, third, and fourth fixed protrusions and a lens holding portion provided with first, second, third, and fourth supporting holes corresponding to the first, second, third, and fourth respective fixed protrusions of the lens,
   in which among the first, second, third and fourth fixed protrusions, the first, second, and third fixed protrusions are arranged in an outer peripheral portion of the flange part at predetermined intervals for providing three-point support, and the fourth fixed protrusion is arranged on a line connecting the first fixed protrusion and the center of the lens;
   wherein the first supporting hole corresponding to the first fixed protrusion is provided as a reference hole including an opening having substantially a same size as the first fixed protrusion;
   the second and third fixed protrusions have approximately a same size and the second and third supporting holes have approximately a same size and further the second and third supporting holes corresponding to the second and third fixed protrusions are provided as loosely fitting holes including openings larger than the second and third fixed protrusions;
   the fourth supporting hole corresponding to the fourth fixed protrusion includes an elongated hole provided in such a manner as to be elongated along a direction of the first supporting hole, and
   in which the lens is further provided with a gate part located outwardly adjacent to the first fixed protrusion such that said gate part protrudes outwardly from the flange part on the line connecting the first fixed protrusion and the center of the lens, said gate part being an inlet for injecting resin into a mold when molding the lens.

2. The lens barrel according to claim 1, in which the first, second, and third fixed protrusions and the first, second, and third supporting holes are fixed by squashing respective fixed protrusions into an umbrella shape with heat treatment and the fourth fixed protrusion and the fourth supporting hole are fixed only by a fitting operation.

3. A lens barrel assembly comprising:
   a plastic lens provided with a flange part having first, second, third, and fourth fixed protrusions; and
   a lens holding portion adapted for holding the lens, said lens holding portion having first, second, third, and fourth supporting holes respectively corresponding to the first, second, third, and fourth fixed protrusions of the lens,
   in which the first, second, and third fixed protrusions are arranged in an outer peripheral portion of the flange part at predetermined intervals, and the fourth fixed protrusion is arranged on a line connecting the first fixed protrusion and a center of the lens;
   in which the first supporting hole includes an opening having substantially a same size as the first fixed protrusion, the second and third fixed protrusions have approximately a same size and the second and third supporting holes have approximately a same size and the second and third supporting holes include openings larger than the second and third fixed protrusions, and the fourth supporting hole includes an elongated hole, and in which the lens is further provided with a gate part located outwardly adjacent to the first fixed protrusion such that said gate part protrudes outwardly from the flange part on the line connecting the first fixed protrusion and the center of the lens, said gate part being an inlet for injecting resin into a mold when molding the lens.

4. The lens barrel assembly according to claim 3, in which the lens holding portion includes an attaching hole for the lens which includes an opening with a center and a circumferential portion having the first, second, third, and fourth supporting holes and in which the elongated hole is elongated along a line which connects a center of the first supporting hole and the center of the opening of the attaching hole.

5. A lens barrel comprising:

a lens holding portion having first, second, third, and fourth supporting holes, said lens holding portion being adapted for holding a lens provided with a flange part having first, second, third, and fourth fixed protrusions which respectively correspond to the first, second, third, and fourth supporting holes, in which the first, second, and third fixed protrusions are arranged in an outer peripheral portion of the flange part at predetermined intervals, and the fourth fixed protrusion is arranged on a line connecting the first fixed protrusion and a center of the lens;

in which the first supporting hole includes an opening having substantially a same size as the first fixed protrusion, the second and third fixed protrusions have approximately a same size and the second and third supporting holes have approximately a same size and the second and third supporting holes include openings larger than the second and third fixed protrusions, and the fourth supporting hole includes an elongated hole, and in which the lens is further provided with a gate part located outwardly adjacent to the first fixed protrusion such that said gate part protrudes outwardly from the flange part on the line connecting the first fixed protrusion and the center of the lens, said gate part being an inlet for injecting resin into a mold when molding the lens.

* * * * *